US007601431B2

(12) United States Patent
Pareek et al.

(10) Patent No.: US 7,601,431 B2
(45) Date of Patent: Oct. 13, 2009

(54) PROCESS FOR COATING ARTICLES AND ARTICLES MADE THEREFROM

(75) Inventors: Vinod Kumar Pareek, Albany, NY (US); David A. Helmick, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 276 days.

(21) Appl. No.: 11/285,486

(22) Filed: Nov. 21, 2005

(65) Prior Publication Data

US 2007/0116973 A1 May 24, 2007

(51) Int. Cl.
*B32B 15/01* (2006.01)

(52) U.S. Cl. ....................... 428/557; 428/650; 428/666; 428/667; 428/678; 428/690

(58) Field of Classification Search ................. 428/548, 428/557, 680, 681, 678, 666, 667, 650
See application file for complete search history.

(56) References Cited

U.S. PATENT DOCUMENTS

| | | | | |
|---|---|---|---|---|
| 3,864,093 | A * | 2/1975 | Wolfla | 428/564 |
| 3,941,903 | A | 3/1976 | Tucker, Jr. | |
| 4,034,142 | A | 7/1977 | Hecht | |
| 4,124,737 | A | 11/1978 | Wolfla et al. | |
| 4,163,071 | A * | 7/1979 | Weatherly et al. | 427/451 |
| 4,256,779 | A | 3/1981 | Sokol et al. | |
| 4,275,090 | A * | 6/1981 | McComas et al. | 427/451 |
| 4,275,124 | A | 6/1981 | McComas et al. | |
| 4,585,481 | A | 4/1986 | Gupta et al. | |
| 4,925,626 | A | 5/1990 | Anand et al. | |
| 5,277,936 | A | 1/1994 | Olson et al. | |
| 5,652,028 | A | 7/1997 | Taylor et al. | |
| 5,741,556 | A | 4/1998 | Taylor et al. | |
| 5,743,013 | A | 4/1998 | Taylor et al. | |
| 5,833,829 | A * | 11/1998 | Foster | 205/109 |
| 5,863,668 | A * | 1/1999 | Brindley et al. | 428/612 |
| 6,000,627 | A | 12/1999 | Chernyshov | |
| 6,071,628 | A | 6/2000 | Seals et al. | |
| 6,254,704 | B1 | 7/2001 | Laul et al. | |
| 6,410,159 | B1 | 6/2002 | Hermanek | |
| 6,454,992 | B1 * | 9/2002 | Hebsur | 419/32 |
| 6,503,575 | B1 | 1/2003 | Payne et al. | |
| 6,503,576 | B1 | 1/2003 | Russo et al. | |
| 6,706,319 | B2 * | 3/2004 | Seth et al. | 427/190 |
| 6,808,756 | B2 * | 10/2004 | Hajmrle et al. | 427/449 |
| 6,811,898 | B2 * | 11/2004 | Ohara et al. | 428/697 |
| 2002/0187336 | A1 * | 12/2002 | Khan et al. | 428/323 |
| 2002/0197155 | A1 * | 12/2002 | Howard et al. | 415/173.4 |
| 2004/0023056 | A1 * | 2/2004 | Braillard et al. | 428/570 |
| 2004/0202885 | A1 | 10/2004 | Seth et al. | |
| 2005/0112411 | A1 | 5/2005 | Gray et al. | |
| 2005/0287296 | A1 * | 12/2005 | Wadley et al. | 427/248.1 |

FOREIGN PATENT DOCUMENTS

| | | | |
|---|---|---|---|
| EP | 1 052 041 | A1 | 11/2000 |
| EP | 1225251 | A2 | 7/2002 |
| EP | 1634976 | A1 | 3/2006 |
| GB | 2063305 | A | 6/1981 |
| GB | 2069009 | A | 8/1981 |
| WO | WO 97/23303 | | 7/1997 |

OTHER PUBLICATIONS

Merriam Webster On line—http://www.m-w/dictionary/intermetallic.*

"Integrated Gasification, Combined-Cycle", http://www.manatee-teco.com/TEEVPowerPlantsIGCC.cfm, Oct. 31, 2005, 2 pgs.

"Tampa Electric—Electricity Generation Tutorial", http://www.tampaelectric.com/Education/TEEDElecGen.html, Oct. 31, 2005, 1 pg.

European Search Report; European Application No. 06124284 Dated Feb. 5, 2007; Reference: 192778-11951; 4 pages.

European Search Report; European Application No. 06124418 Dated Feb. 13, 2007; Reference : 188516/11950; 9 pages.

Non-Final Office Action; U.S. Appl. No. 11/559,060; Filing Date: Nov. 13, 2006; Notification Date: May 15, 2009; 35 Pages.

* cited by examiner

*Primary Examiner*—Timothy M Speer
(74) *Attorney, Agent, or Firm*—Cantor Colburn LLP

(57) ABSTRACT

In one embodiment, a coated turbine article comprising a uniform enhanced coating on at least a portion of the turbine article, wherein the enhanced coating comprises a coating material and a structural enhancer, wherein the structural enhancer is selected from the group consisting of oxide, carbide, nitride, intermetallic material, and combinations comprising at least one of the foregoing, wherein the structural enhancer has an average particle size, as measured along a major axis, of about 0.01 μm to about 100 μm.

6 Claims, No Drawings

PROCESS FOR COATING ARTICLES AND ARTICLES MADE THEREFROM

BACKGROUND

When exposed to high temperatures (i.e., greater than or equal to about 1,300° C.) and to oxidative environments, metals can oxidize, corrode, and become brittle. These environments are produced in turbines used for power generation applications. Thermal barrier coatings (TBC), when applied to metal turbine components, can reduce the effects that high-temperature, and corrosive and oxidative environments have on the metal components.

Thermal barrier coatings can comprise a metallic bond coating and a ceramic coating. The metal bond coating can comprise of oxidation resistant protective materials such as aluminum, chromium, aluminum alloys, and chromium alloys. For example, the metallic bond coating can comprise of chromium, aluminum, yttrium, or combinations of the forgoing, such as MCrAlY where M is nickel, cobalt, or iron (U.S. Pat. No. 4,034,142 to Hecht, and U.S. Pat. No. 4,585,481 to Gupta et al. describe some coating materials). These metallic bond coatings can be applied by thermal spraying techniques.

The family of thermal spray processes includes detonation gun deposition, high velocity oxy-fuel deposition (HVOF) and its variants such as high velocity air-fuel, plasma spray, flame spray, and electric wire arc spray. In most thermal coating processes a material in powder, wire, or rod form (e.g., metal) is heated to near or somewhat above its melting point and droplets of the material accelerated in a gas stream. The droplets are directed against the surface of a substrate to be coated where they adhere and flow into thin lamellar particles called splats.

In a typical detonation gun deposition process, a mixture of oxygen and a fuel such as acetylene along with a pulse of powder of the coating material is injected into a barrel, such as a barrel of about 25 millimeters (mm) in diameter and over a meter long. The gas mixture is detonated, and the detonation wave moving down the barrel heats the powder to near or somewhat above its melting point and accelerates it to a velocity of about 750 meters per second (m/sec). The molten, or nearly molten, droplets of material strike the surface of the substrate to be coated and flow into strongly bonded splats. After each detonation, the barrel is generally purged with an inert gas such as nitrogen, and the process repeated many times a second. Detonation gun coatings typically have a porosity of less than two volume percent with very high cohesive strength as well as very high bond strength to the substrate.

In high velocity oxy-fuel and related coating processes, oxygen, air or another source of oxygen, is used to bum a fuel such as hydrogen, propane, propylene, acetylene, or kerosene, in a combustion chamber and the gaseous combustion products allowed to expand through a nozzle. The gas velocity may be supersonic. Powdered coating material is injected into the nozzle and heated to near or above its melting point and accelerated to a relatively high velocity, such as up to about 600 m/sec. for some coating systems. The temperature and velocity of the gas stream through the nozzle, and ultimately the powder particles, can be controlled by varying the composition and flow rate of the gases or liquids into the gun. The molten particles impinge on the surface to be coated and flow into fairly densely packed splats that are well bonded to the substrate and each other.

In the plasma spray coating process a gas is partially ionized by an electric arc as it flows around a tungsten cathode and through a relatively short converging and diverging nozzle. The temperature of the plasma at its core may exceed 30,000 K and the velocity of the gas may be supersonic. Coating material, usually in the form of powder, is injected into the gas plasma and is heated to near or above its melting point and accelerated to a velocity that may reach about 600 m/sec. The rate of heat transfer to the coating material and the ultimate temperature of the coating material are a function of the flow rate and composition of the gas plasma as well as the torch design and powder injection technique. The molten particles are projected against the surface to be coated forming adherent splats.

In the flame spray coating process, oxygen and a fuel such as acetylene are combusted in a torch. Powder, wire, or rod, is injected into the flame where it is melted and accelerated. Particle velocities may reach about 300 m/sec. The maximum temperature of the gas and ultimately the coating material is a function of the flow rate and composition of the gases used and the torch design. Again, the molten particles are projected against the surface to be coated forming adherent splats.

Thermal spray coating processes have been used for many years to deposit layered coatings. These coatings consist of discrete layers of different composition and properties. For example, the coating may be a simple duplex coating consisting of a layer of a metal alloy such as nickel-chromium adjacent to the substrate with a layer of zirconia over it.

The coating processes can be used to apply thermal barrier coatings (TBC) and/or environmental barrier coatings (EBC) to components of turbines, engines, and the like, to protect the components from the harsh operating environments. To protect turbine components in these combustion environments, a class of coatings has been developed based on the formula MCrAlY where M represents a transition metal such as iron, cobalt, or nickel. A current problem exists when MCrAlY coatings are used in integrated gasification combined cycle (IGCC) systems. IGCC systems use an innovative process, which uses coal to produce power. The process is cleaner and more economically efficient than other processes that use coal to produce power. The process involves treating coal and reforming coal to a gas mixture that includes hydrogen gas ($H_2$), carbon monoxide (CO), and carbon particulates. This gas mixture is combusted with oxygen in a turbine to produce power. The carbon particulates, however, collide with the coated turbine components and erode the components and/or coatings, and thereby shorten the effective operating life of the components.

Therefore, there exists a need for coatings that can provide improved protection for turbine components.

SUMMARY OF THE INVENTION

Disclosed herein are methods for coating articles and articles made therefrom. In one embodiment, a coated turbine article comprising a uniform enhanced coating on at least a portion of the turbine article, wherein the enhanced coating comprises a coating material and a structural enhancer, wherein the structural enhancer is selected from the group consisting of oxide, carbide, nitride, intermetallic material, and combinations comprising at least one of the foregoing, wherein the structural enhancer has an average particle size, as measured along a major axis, of about 1 μm to about 100 μm.

In another embodiment, a coated turbine article comprises a article formed from the process comprising: forming a mixture of a coating material and a structural enhancer selected from the group consisting of oxide, carbide, nitride, intermetallic material, and combinations comprising at least one of the foregoing, wherein the mixture comprises an initial structural enhancer concentration; heating the mixture; and propelling the mixture at the article to form the enhance coating, wherein the enhanced coating has a final structural enhancer concentration that less than or equal to 5 vol % greater than the initial structural enhancer concentration, based upon a total volume of the enhanced coating.

The above described and other features are exemplified by the following detailed description and appended claims.

DETAILED DESCRIPTION

The terms "first," "second," and the like, herein do not denote any order, order quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt%, or, more specifically, about 5 wt% to about 20 wt %", is inclusive of the endpoints and all intermediate values of the ranges of "about 5 wt% to about 25 wt%," etc). The notation "±10%" means that the indicated measurement may be from an amount that is minus 10% to an amount that is plus 10% of the stated value.

Metallic coating structural integrity can be enhanced by combining structural enhancer(s) (e.g., carbide(s) and/or oxide(s)) into the coatings. However, when a thermal spray process is controlled (e.g., temperature) to form the structural enhancers (e.g., oxides) as the coating materials are sprayed at the component, the distribution of the structural enhancer(s), as well as the particle sizes of the structural enhancer(s) is not fully controlled. Disclosed herein is a method for forming an enhanced barrier coating on a component and the components made therefrom. This process enables control of the structural enhancer(s)' particle size as well as enabling uniform distribution of the structural enhancer(s) throughout desired area(s) of the coating. As used herein, "uniform" and "uniform distribution" refers to a change in concentration across the entire area of the enhanced coating comprising that material of less than or equal to 5 volume percent (vol %). For example, if the enhanced coating is deposited on a leading edge of a component while a different coating is deposited on the remainder of the component, a change in concentration throughout the enhanced coating will be less than or equal to 5 vol %.

The thermal spray process (e.g., HVOF, plasma spray (such as low pressure plasma spraying, vacuum plasma spraying, and so forth), or a combination comprising at least one of the forgoing processes) comprises mixing coating material(s) with the structural enhancer(s), e.g., prior to introduction to the spray stream and/or in the spray stream. Desirably, less than or equal to about 5 vol %, or, more specifically, less than or equal to about 2 vol % of the coating material(s) convert to oxides and/or carbides during the coating process. Therefore, the concentration of the enhanced coating is controlled. In other words, this process enables control of the particular structural enhancer(s), including desired particle sizes and size distributions, and combines those structural enhancer(s) with the coating material(s) to form a mixture that can produce an enhanced coating with a chosen composition (e.g., the concentration of the structural enhancer(s) can be controlled).

The process comprises introducing the mixture to the combustion chamber, spray stream, and/or so forth (depending upon the particular spray process), and sufficiently heating the mixture to enable the particles to splat on and adhere to the component. For example, and HVOF process can be employed where oxygen and fuel combust and propel the mixture at the component. In order to control the production of oxides and/or carbides in the spray as the mixture is propelled at the component, the spray conditions can be controlled. The spray can be controlled such that the temperature of the particles (e.g., coating material(s) and structural enhancer(s)) being propelled at the component is a temperature sufficient to soften the particles such that they adhere to the component and less than a temperature that causes oxidation of the coating material(s), with the specific temperature dependent upon the type of coating material(s) and structural enhancer(s). For example, the coating temperature can be less than or equal to about 1,500° C., or, more specifically, less than or equal to about 1,200° C., or, even more specifically, about 750° C. to about 1,100° C. The temperature can be controlled such that the concentration of structural enhancer(s) can change from the mixture to the enhanced coating by less than or equal to about 5 vol %, or, more specifically, less than or equal to about 2 vol %, or, even more specifically, less than or equal to about 1 vol %. For example, if the mixture comprises 10 vol % structural enhancer(s), based upon the total volume of the mixture, the final coating will comprise less than or equal to about 15 vol % structural enhancer(s), based upon the total volume of the enhanced coating.

The coating material(s) to form the barrier coatings (e.g., thermal barrier coatings and/or environmental barrier coatings) can include nickel (Ni), cobalt (Co), iron (Fe), chromium (Cr), aluminum (Al), yttrium (Y), alloys comprising at least one of the foregoing, as well as combinations comprising at least one of the foregoing, e.g., the coating can comprise MCrAlY (where M comprises nickel, cobalt, iron, and combinations comprising at least one of the forgoing). An MCrAlY coating can further comprise elements such as silicon (Si), ruthenium (Ru), iridium (Ir), osmium (Os), gold (Au), silver (Ag), tantalum (Ta), palladium (Pd), rhenium (Re), hafnium (Hf), platinum (Pt), rhodium (Rh), tungsten (W), alloys comprising at least one of the foregoing, as well as combinations comprising at least one of the foregoing.

Structural enhancer(s) that can be mixed with the coating material(s) include oxide(s), carbide(s), nitride(s), intermetallic(s) (e.g., a stoichiometric metallic compound), and so forth, as well as combinations comprising at least one of the foregoing. Possible oxides include alumina, zirconia, silica, and so forth, as well as combinations comprising at least one of the foregoing. These oxides can be stabilized, for example, with stabilizers such as yttrium, barium, magnesium, calcium, strontium, beryllium, a lanthanide element, and so forth, as well as combinations comprising at least one of the foregoing stabilizers; e.g., yttria stabilized zirconia.

The structural enhancer(s) can have an average particle size, as measured along a major axis, of up to about 100 mircrometer (μm) or so (e.g., about 0.01 μm to about 100 μm), or more specifically,about 1 μm to about 50 μm, or, even more specifically, about 5 μm to about 25 μm. Since the structural enhancer(s) are mixed with the coating material(s) prior to introduction to the spray stream, the particles size is both the particles size of the structural enhancer(s) in the mixture and in the enhanced coating The structural enhancer(s) can be present in a sufficient amount to enhance the structural integrity of the coating against physical erosion. For example, the structural enhancer(s) can be present in an amount of less than or equal to about 25 vol %, or, more specifically, about 1 vol % to about 15 vol %, or, even more specifically, about 5 vol% to about 10 vol %, based upon the total volume of the enhanced coating. The particular concentration of the structural enhancer(s) can be determined based upon the particular component and the operating conditions for that component. For example, whether the component is blade, vane, stator, nozzle, bucket, etc., in a turbine (e.g., in an IGCC system), and the component's location in the system, e.g., first stage, second stage, and so forth, can affect the desired coating composition as well as the amount and location of the enhanced coating on the component. For example, the present coating can be particularly useful on first stage components, e.g., components that tend to experience higher erosion rates than other turbine components.

As with the enhanced coating composition, the enhanced coating thickness can be chosen based upon the particular component, the operating conditions for that component, and the location of the coating on that component. The enhanced coating thickness can be about 0.05 millimeters (mm) to about 0.75 mm or so, or, more specifically, about 0.1 mm to about 0.5 mm, or, even more specifically, about 0.15 mm to about 0.3 mm.

Optionally, once the enhanced coating has been applied to the component, the component can be further processed, e.g., to improve the bond between the coating material and the substrate. For example, the component with the enhanced coating can be heat treated, e.g., to enable the formation of chemical bonding. The heat treating can be at temperatures of about 900° C. (1,650° F.) to about 1,200° C. (2,190° F.), e.g., about 1,100° C. (2,012° F.) for about 0.5 hours to about 6 hours or so, under a vacuum or in an inert environment (e.g., with an inert gas that will not chemically interact with the coating).

EXAMPLES

Deposition can be accomplished using a methods such as plasma spraying (low pressure plasma spraying (LPPS), vacuum plasma spraying (VPS) and/or HVOF), e.g., with a thermal spray gun manufactured by Sulzer Metco. In the deposition, MCrAlY and structural enhancer particles can be mixed in a ratio of 80 vol % to 20 vol %, respectively, in a hopper. The particle sizes of the MCrAlY powder and the structural enhancer can be about 0.01 μm to about 100 μm. The powder mixture can then be fed from the hopper to the gun where it is heated and accelerated onto a component disposed in the hot gas path. The coating can be applied to a nominal thickness of 10 mils with a constant volume percentage of structural enhancer particles through the thickness and the coverage area. This process has been found particularly useful for components used in turbines in IGCC plants.

The enhanced coatings and process of forming these coatings can be used in numerous applications, including to coat turbine components or portions thereof More specifically, the enhanced coatings can be utilized in components exposed to the hot gas path of the turbine engine including those used in IGCC systems. In 1GCC systems, a synthesis gas is first reformed from coal and then combusted inside a turbine engine. The combustion stream often comprises carbon particulates that can impinge on the turbine components, causing physical erosion. By forming the enhanced coatings on portions of the components susceptible to this erosion, the life of the component can be substantially enhanced.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coated article, comprising:

an enhanced coating on at least a portion of the article, wherein the enhanced coating comprises a coating material, a first structural enhancer, and a second structural enhancer;

wherein the first structural enhancer comprises an intermetallic compound consisting of two or more metals, and the second structural enhancer comprises an oxide selected from the group consisting of alumina, zirconia, silica, and combinations comprising at least one of the foregoing oxides, and wherein the first structural enhancer and the second structural enhancer has an average particle size, as measured along a major axis, of about 1.0 μm to about 50 μm.

2. The article of claim 1, wherein the average particle size is about 5 μm to about 25 μm.

3. The article of claim 1, wherein the coating material comprises MCrAlY, wherein M is selected from the group consisting of nickel, cobalt, iron, and combinations comprising at least one of the foregoing.

4. The article of claim 3, wherein the coating material further comprises an element selected from the group consisting of silicon, ruthenium, iridium, osmium, gold, silver, tantalum, palladium, rhenium, hafnium, platinum, rhodium, tungsten, alloys comprising at least one of the foregoing, and combinations comprising at least one of the foregoing.

5. The article of claim 3, wherein the coating material further comprises an element selected from the group consisting of ruthenium, iridium, osmium, gold, silver, tantalum, palladium, rhenium, platinum, rhodium, tungsten, alloys comprising at least one of the foregoing, and combinations comprising at least one of the foregoing.

6. The article of claim 1, wherein the oxide comprises alumina.

* * * * *